G. L. BLANCHARD.
FLOAT FOR LINTERS.
APPLICATION FILED MAR. 5, 1909.

947,367.

Patented Jan. 25, 1910.

WITNESSES:
John S. Murray.
Jack A. Achley.

INVENTOR
George L. Blanchard
BY John M. Spellman
ATTORNEY

UNITED STATES PATENT OFFICE.

GEORGE L. BLANCHARD, OF YOAKUM, TEXAS.

FLOAT FOR LINTERS.

947,367.                Specification of Letters Patent.    Patented Jan. 25, 1910.

Application filed March 5, 1909. Serial No. 481,411.

*To all whom it may concern:*

Be it known that I, GEORGE L. BLANCHARD, a citizen of the United States, residing at Yoakum, in the county of Dewitt and State of Texas, have invented certain new and useful Improvements in Floats for Linters, of which the following is a specification.

My invention relates to new and useful improvements in floats for linters.

The object of the invention is to provide a float for removing the lint from the cotton seed in an expeditious manner and one which will have a greater capacity and operate with more rapidity than those commonly in use.

Another feature of the invention resides in the provision of a revolving part having an abrading surface acting in conjunction with retarding means.

Finally, the object of the invention is to provide a device of the character described that will be strong, durable, efficient and simple and comparatively inexpensive to produce, also one in which the several parts will not be likely to get out of working order.

Figures 1, 4:
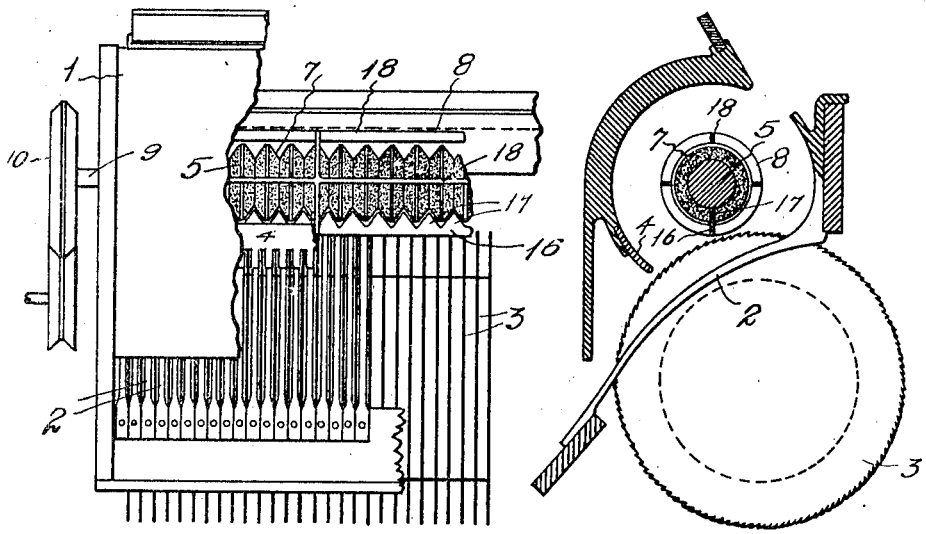
Figures 2, 3:
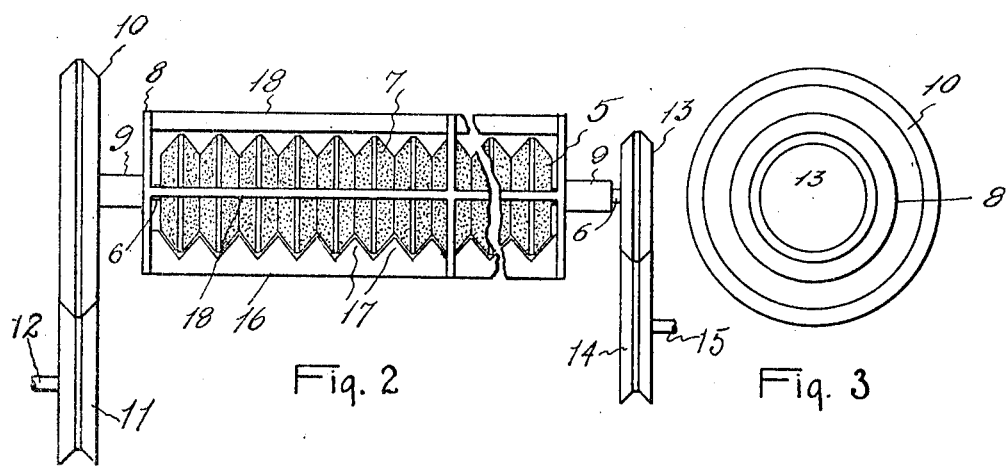

With the above and other objects in view, the invention has relation to certain novel features of construction and operation, an example of which is described in the following specification and illustrated in the accompanying drawing, wherein:

Figure 1 is a partial elevation of a linter with parts broken away to show underlying constructions, Fig. 2 is an elevation of the float and its operating means, Fig. 3 is an end elevation, and Fig. 4 is a transverse vertical sectional view of the upper portion of the linter.

In the drawings, the numeral 1, designates the linter casing in which the usual ribs 2, saws 3 and fingers 4 are arranged to perform their ordinary duties.

In the casing I mount a float 5 fixed on a shaft 6. This float or cylinder is provided with a corrugated surface 7, which surface, however, is angular to form in cross section a plurality of V-shaped grooves.

The float is supported in a cylindrical frame 8 formed at each end with hollow trunnions 9 through which the shaft 6 projects. These trunnions are mounted to revolve in the ends of the casing. At the left-hand side, with relation to Figs. 1 and 2, the trunnion 9 extends beyond the casing and has fixed thereon a friction pulley 10 which bears against a friction driving pulley 11 mounted on the end of a suitably supported and driven shaft 12. At the right hand side of the above named figures it will be noticed that the shaft 6 extends beyond the trunnion and receives a friction pulley 13 engaging with another friction pulley 14 fixed on the end of a suitably supported and driven shaft 15. I wish to call attention to the fact that the pulley 10 is considerably greater in diameter than the pulley 13, while the pulleys 11 and 14 have substantially the same diameter. The last mentioned pulleys are driven at the same rate of speed and in the same direction which causes the frame and the float to revolve in the same direction but at different rates of speed owing to the relative sizes of their pulleys. It is essential that the float revolves faster than the frame.

At one side the frame is provided with a longitudinally extending blade 16 provided along its inner edge with a plurality of V-shaped fingers 17 which extend into the V-shaped grooves on the surface of the float and having their edges in close proximity to the surface of the float.

The surface of the float is roughened or coated with a suitable abrasive material with which the cotton seed contacts during the operation of the linter. The frame is also provided with longitudinal bars 18 equally spaced therearound with relation to the blade 16.

When the cotton seed is fed into the casing it is caught and carried around by the frame and float, the abrasive surface removing the cotton from the seeds and delivering it to the saws. It will be noted that the bars 18 tend to catch the seeds and support them about the float during the operation of the same; while the blade supports and holds the seeds while they are being subjected to the abrading action. The float revolving considerably faster than the frame it is obvious that the passage of the seeds around and past the float is retarded or the seeds retained in contact with the rapidly revolving float a sufficient time to thoroughly carry out the abrading action and increase the capacity of the float.

What I claim is:

A float for linters, comprising a rotatably mounted, cylindrical body, having an abrading surface, with transverse corrugations thereupon, and a frame, mounted to revolve about the body carrying a number of longitudinal bars adjacent to the surface of the cylindrical body, one of said bars being provided with teeth adapted to enter the corrugations of the body, and the frame being rotated in the same direction as the body but at lesser speed.

In testimony whereof I have signed my name to this specification in the presence of two subscribing witnesses.

GEORGE L. BLANCHARD.

Witnesses:
FRANK SIMEK,
FRANK FOJTIK.